(12) United States Patent
Mikashima et al.

(10) Patent No.: US 9,212,631 B2
(45) Date of Patent: Dec. 15, 2015

(54) CONTROL APPARATUS OF INTERNAL COMBUSTION ENGINE

(75) Inventors: Kazuya Mikashima, Toyota (JP); Tomoyuki Noguchi, Nissin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 314 days.

(21) Appl. No.: 13/984,161

(22) PCT Filed: Feb. 8, 2011

(86) PCT No.: PCT/JP2011/000686
§ 371 (c)(1),
(2), (4) Date: Aug. 7, 2013

(87) PCT Pub. No.: WO2012/107950
PCT Pub. Date: Aug. 16, 2012

(65) Prior Publication Data
US 2013/0312719 A1    Nov. 28, 2013

(51) Int. Cl.
*F02M 25/07* (2006.01)
*F02D 41/00* (2006.01)
*F02D 41/12* (2006.01)

(52) U.S. Cl.
CPC ....... *F02M 25/0771* (2013.01); *F02D 41/0055* (2013.01); *F02D 41/123* (2013.01); *F02M 25/0701* (2013.01); *F02M 25/0745* (2013.01); *F02D 2200/0406* (2013.01); *F02M 25/0707* (2013.01); *F02M 25/0727* (2013.01); *F02M 25/0735* (2013.01); *Y02T 10/47* (2013.01)

(58) Field of Classification Search
CPC .............. F02M 25/07; F02M 25/0771; F02M 25/0701; F02M 25/0745; F02M 25/0727; F02M 25/0707; F02M 25/0735; F02D 41/00; F02D 41/0025; F02D 41/123; F02D 2200/0406; Y02T 10/47
See application file for complete search history.

(56) References Cited

U.S. PATENT DOCUMENTS 6,295,815 B1    10/2001    Bechle et al.
8,683,977 B2 *   4/2014    Miyashita ................ 123/568.16

FOREIGN PATENT DOCUMENTS

| DE | 19854461 C1 | 3/2000 | |
|----|----|----|----|
| EP | 1930581 A1 | 6/2008 | |
| JP | 63-075345 A | 4/1988 | |
| JP | 2003-056411 A | 2/2003 | |
| JP | 2005-299514 A | 10/2005 | |
| JP | 2007-303381 A | 11/2007 | |
| JP | 2008-038636 A | 2/2008 | |
| JP | 2009-228530 A | 10/2009 | |
| JP | 2010-255599 A | 11/2010 | |
| JP | 2013199886 A * | 10/2013 | ............. F02M 25/07 |

* cited by examiner

*Primary Examiner* — Hieu T Vo
(74) *Attorney, Agent, or Firm* — Kenyon & Kenyon LLP

(57) ABSTRACT

Provided is a control apparatus of the internal combustion engine capable of removing deposited foreign matters accumulated on an EGR valve without deteriorating a combustion state of the internal combustion engine. When the vehicle is under deceleration and under fuel cut operation, the ECU opens an EGR shutoff valve and obtains an intake pressure "Pclose" under the EGR valve in the fully closed state. Then, the ECU opens the EGR valve and obtains an intake pressure "Popen" under the EGR valve in the fully opened state. Then, the ECU calculates a difference ΔP between "Popen" and "Pclose", and closes the EGR shutoff valve on the condition that the difference ΔP is equal to or smaller than a threshold value "Pth1". Then, the ECU opens the EGR valve, and subsequently opens the EGR valve.

19 Claims, 6 Drawing Sheets

CONTROL APPARATUS OF INTERNAL COMBUSTION ENGINE

CROSS REFERENCE TO RELATED APPLICATION

This is a national phase application based on the PCT International Patent Application No. PCT/JP2011/000686 filed on Feb. 8, 2011, the entire contents of which are incorporated herein by reference.

TECHNICAL FIELD

The present invention relates to a control apparatus of an internal combustion engine provided with an exhaust gas recirculation apparatus therein.

BACKGROUND ART

Up until now, there has been proposed an exhaust gas recirculation apparatus for recirculating exhaust gas burned in a combustion chamber to an intake passage as an EGR gas to reduce a fuel consumption amount of an internal combustion engine (see for example Patent Document 1).

The exhaust gas recirculation apparatus disclosed in the Patent Document 1 comprises an EGR passage for allowing part of the exhaust gas flowing in an exhaust passage to be recirculated to an intake passage, an EGR valve provided in the EGR passage to adjust the flow amount of the EGR gas to be recirculated in the intake passage, and an EGR cooler provided between the EGR valve and the exhaust passage to cool the EGR gas by heat exchange between the EGR gas and cooling water to be used for the internal combustion engine.

The exhaust gas recirculation apparatus thus constructed can realize the recirculation of the EGR gas to the intake passage from the exhaust passage in response to the operation state of the internal combustion engine by adjusting the flow amount of the EGR gas to be recirculated in the EGR passage by the EGR valve.

The EGR gas contains PM (particulate matter), unburned gas, lubrication oil, and the like, which are adhered to or accumulated on a valve body or a valve seat forming part of the EGR valve. These foreign matters caught between the valve body and valve seat hinders the valve body from being seated on the valve seat, thereby causing a trouble that the circulation flow amount of the EGR gas cannot be controlled.

For this reason, the EGR valve is constituted by a flow control valve such as a poppet-type valve or a butterfly-type valve which is capable of selectively opening or closing the EGR passage.

There are known, as conventional exhaust gas recirculation apparatuses, such apparatuses capable of adjusting the opening degree of the valve by moving the valve body upward and downward by a stepping motor. (For example, Patent Document 2)

The exhaust gas recirculation apparatus disclosed in the Patent Document 2 comprises an exhaust gas recirculation passage for communicating the exhaust passage and the intake passage of the internal combustion engine, an exhaust gas recirculation control valve arranged in the exhaust gas recirculation passage to have the opening degree of the valve body with respect to the valve seat designed to be controlled by the reciprocating motion of the valve body activated by a motor, and a foreign matter removal control unit for performing a foreign matter removal operation to open the valve body to the fully opened position at least once in the event that predetermined conditions are established. Here, the aforementioned predetermined conditions include a condition to be established before the start of the cranking at the time of the start of the internal combustion engine.

By the construction set forth in the above description, the foreign mater removal operation is performed at the start of the internal combustion engine but not immediately after the stop of the internal combustion engine as the time of the predetermined condition fully achieved. Therefore, the oil component with a viscosity that may cause the foreign matters to be adhered is evaporated to some extent, and the valve body is fully opened with the foreign matters maintained in dry conditions, thereby making it possible to easily remove the foreign matters caught between the valve body and the valve seat. In addition, the influence to the operability of the engine can be lowered because the opening and closing operations of the valve body are performed before the start of the internal combustion engine.

Further, in recent years, to improve the control of EGR gas in the low flow area, butterfly-type valves are being adopted in lieu of poppet-type valves (see for example Patent Document 3).

The control apparatus of the internal combustion engine as disclosed in the Patent Document 3 is applied to an internal combustion engine which comprises a butterfly valve body arranged in the gas passage of the internal combustion engine, and an actuator to rotate the butterfly valve body, so that the actuator is operated to perform the control to open and close the butterfly valve body. The control apparatus of the internal combustion engine as disclosed in the Patent Document 3 comprises a deposit amount estimation unit operative to calculate the amount of the deposits generated in response to the operation state of the internal combustion engine and to estimate the amount of the deposits accumulated in the gas passage by summing up the amount of the deposits thus calculated, and a deposit removal unit operative to rotate the butterfly valve body based on the accumulated amount of the deposits estimated by the deposit amount estimation unit to remove the deposits at the time of the operation of the internal combustion engine.

The control apparatus of the internal combustion engine as disclosed in the Patent Document 3 is operative to remove the accumulated deposits during the operation of the internal combustion engine, thereby making it possible to effectively remove the deposits. To be more specific, the control apparatus of the internal combustion engine is so designed to rotate the butterfly valve body during the operation of the internal combustion engine when there is generated the flow of the gas in the gas passage, so that the deposits caught in the butterfly valve body are blown off by the flow of the gas, thereby making it possible to effectively remove the deposits.

CITATION LIST

Patent Literature

[PTL 1] Japanese Patent Application Publication No. 2009-228530

[PTL 2] Japanese Patent Application Publication No. 2003-56411

[PTL 3] Japanese Patent Application Publication No. 2008-38636

SUMMARY OF INVENTION

Technical Problem

However, the conventional control apparatus of the internal combustion engine previously mentioned likely causes the EGR gas to be mixed with the intake gas in the driving area where the EGR gas is not needed to be recirculated in the intake passage if the deposited material failed to be removed from the EGR valve is caught between the valve body and the valve seat, thereby preventing the EGR valve from being driven to the completely closed state. For this reason, the control apparatus of the internal combustion engine previously mentioned is apt to deteriorate the combustion state of the internal combustion engine, thereby possibly resulting in not only causing the rotational fluctuation or the engine stall of the internal combustion engine, but also generating catalyst damage or the like.

Further, the conventional exhaust gas recirculation apparatus disclosed in the Patent Document 2 has such a problem that the valve body is being opened and closed prior to the start of the internal combustion engine when there is no flow of gas, thereby making it difficult to remove the foreign matters such as the deposits. Whereas, the conventional exhaust gas recirculation apparatus disclosed in the Patent Document 3 has such a problem that the EGR valve is opened and closed during the operation of the internal combustion engine for the purpose of removing the foreign matters adhered to the EGR valve, causing the sharp increase of the EGR gas flow, with the result that the combustion state of the internal combustion engine is deteriorated.

It is therefore an object of the present invention to solve the previously mentioned problems and to provide a control apparatus of an internal combustion engine which can remove the foreign matters such as the deposits that have been accumulated on the EGR valve without deteriorating the combustion state of the internal combustion engine.

Solution to Problem

To achieve the above object of the present invention, a control apparatus of an internal combustion engine according to the present invention for recirculating part of exhaust gas discharged into an exhaust passage from the internal combustion engine into an intake passage as an EGR gas comprises: an EGR pipe having an EGR passage formed therein, the EGR passage having the exhaust passage held in communication with the intake passage; a first valve provided in the EGR passage in the vicinity of the exhaust passage and operative to take a desired state between an opened state and a closed state, the first valve being operative to shut off the EGR gas from being flowed into the EGR passage when the first valve is in the closed state; a second valve provided in the EGR passage between the intake passage and the first valve and to take a desired state between an opened state and a closed state to adjust an amount of the EGR gas flow into the intake passage; a foreign matter detection unit that detects a foreign matter adhered to the second valve; and a switching unit that switches the first valve from the opened state to the closed state on the condition that the foreign matter detection unit detects the foreign matter adhered to the second valve.

By the construction set forth in the above definition, the control apparatus is capable of switching the first valve from the opened state to the closed state on the condition that the foreign matter detection unit detects the foreign matter adhered to the second valve, so that the EGR gas is not flown into the intake passage even if the foreign matter is caught in the second valve, thereby making it possible to suppress the deterioration of the combustion state of the internal combustion engine due to the EGR gas flowing into the intake passage. Therefore, the control apparatus of the internal combustion engine according to the present invention is capable of suppressing the rotational fluctuation of the internal combustion engine, the engine stall, and the catalyst damage or the like.

The control apparatus of the internal combustion engine according to the present invention further comprises a driving unit that drives the second valve between the opened state and the closed state, the driving unit being operative to drive the second valve between the opened state and the closed state on the condition that the foreign matter detection unit detects the foreign matter adhered to the second valve to have the switching unit switch the first valve from the opened state to the closed state.

By the construction set forth in the above definition, the control apparatus is capable of removing the foreign matters such as the deposits adhered to the second valve by driving the second valve between the closed state and the opened state during the operation of the internal combustion engine. Further, the control apparatus is so designed to switch the first valve from the opened state to the closed state when the foreign matter is adhered to the second valve, so that the flow of the EGR gas into the EGR passage is shut off by the first valve when the second valve is driven between the opened state and the closed state for the purpose of removing the foreign matter. Therefore, the control apparatus of the internal combustion engine according to the present invention causes no sharp increase of the amount of EGR gas when the foreign matters are being removed, with the result that the deterioration of the combustion of the internal combustion engine is suppressed.

In the control apparatus of the internal combustion engine according to the present invention, the foreign matter detection unit is operative to detect the foreign matter adhered to the second valve on the condition that the variation of the EGR gas pressure at the opened state of the second valve and the EGR gas pressure at the closed state of the second valve is equal to or smaller than the predetermined threshold value.

By the construction set forth in the above definition, the foreign matter detection unit is capable of precisely detecting the foreign matter adhered to the second valve based on the variation of the pressure of the EGR gas.

In the control apparatus of the internal combustion engine according to the present invention, the foreign matter detection unit detects the foreign matter adhered to the second valve during the fuel cut operation of the internal combustion engine.

By the construction set forth in the above definition, the foreign matter detection unit is operative to detect the foreign matter adhered to the second valve during the fuel cut operation of the internal combustion engine, thereby making it possible to detect whether or not the foreign matter has been adhered to the second valve under the state that the influence to the combustion state of the internal combustion engine due to the variation of the EGR gas flow amount is suppressed.

In the control apparatus of the internal combustion engine according to the present invention, the foreign matter detection unit is operative to detect the foreign matter adhered to the second valve on the condition that the pressure of the EGR gas in the downstream side of the second valve is higher than the predetermined value.

By the construction set forth in the above definition, the foreign matter detection unit is operative to set the intake pressure to a predetermined value of the pressure usually generated during the time when there's no foreign matter adhered to the second valve, thereby making it possible to precisely detect that the foreign matter has been adhered to the second valve based on the pressure of the EGR gas.

In the control apparatus of the internal combustion engine according to the present invention, the foreign matter detection unit is operative to detect the foreign matter adhered to the second valve on the condition that there is generated an accidental fire in the internal combustion engine.

By the construction set forth in the above definition, the foreign matter detection unit is capable of precisely detecting that the foreign matter is adhered to the second valve based on whether or not there is generated the accidental fire of the internal combustion engine.

The control apparatus of the internal combustion engine according to the present invention further comprises an opening degree detection unit that detects an opening degree of the second valve, and the foreign matter detection unit is operative to detect the foreign matter adhered to the second valve on the condition that the difference between a designated opening degree of the second valve and the opening degree detected by the opening degree detection unit is larger than the predetermined threshold value.

By the construction set forth in the above definition, the foreign matter detection unit is capable of precisely detecting the foreign matter adhered to the second valve based on the difference between the designated opening degree and the opening degree detected by the opening degree detection unit.

The control apparatus of the internal combustion engine according to the present invention further comprises a cooling water temperature detection unit that detects the cooling water temperature of the internal combustion engine, the switching unit being operative to switch the first valve to the closed state on the condition that the cooling water temperature detected by the cooling water temperature detection unit is lower than a predetermined threshold value.

By the construction set forth in the above definition, the switching unit is capable of shutting off the flow of the EGR gas in the downstream side of the first valve when the cooling water temperature is lower than the threshold value, thereby making it possible to suppress the condensed water from being generated in the vicinity of the second valve.

In the control apparatus of the internal combustion engine according to the present invention, the switching unit is operative to switch the first valve from the closed state to the opened state on the condition that the cooling water temperature detected by the cooling water temperature detection unit is equal to or higher than the predetermined threshold value.

By the construction set forth in the above definition, the switching unit is so designed to switch the first valve from the closed state to the opened state when the cooling water temperature is lower than the predetermined threshold value, so that the EGR gas can be supplied to the EGR passage, thereby making it possible to recirculate the EGR gas into the intake passage in response to the opened or closed state of the second valve.

In the control apparatus of the internal combustion engine according to the present invention, the driving unit is operative to drive the second valve between the opened state in response to a combustion state of the internal combustion engine to adjust the amount of the EGR gas flowing into the intake passage.

By the construction set forth in the above definition, the control apparatus is capable of adjusting the flow amount of the EGR gas into the intake passage in response to the combustion state of the internal combustion engine, thereby making it possible to appropriately control the combustion state of the internal combustion engine.

In the control apparatus of the internal combustion engine according to the present invention, the driving unit is operative to drive the second valve to repeatedly take the opened state and the closed state on the condition that the foreign matter detection unit detects the foreign matter adhered to the second valve.

By the construction set forth in the above definition, the driving unit is operative to drive the second valve so that the second valve repeatedly take the opened state and the closed state, thereby making it possible to remove the foreign matters such as the deposits that have been accumulated on the second valve.

Advantageous Effects of Invention

The control apparatus of an internal combustion engine according to the present invention can remove the foreign matters such as the deposits that have been accumulated on the EGR valve without deteriorating the combustion state of the internal combustion engine.

DESCRIPTION OF EMBODIMENTS

The control apparatus of the internal combustion engine according to the first embodiment of the present invention will be described hereinafter with reference to the accompanying drawings. The first embodiment of the present invention will be explained about an exhaust gas recirculation apparatus which is applied to a vehicle having a four-cylinder gasoline engine mounted thereon.

Firstly, the construction of the first embodiment will be explained in detail hereinafter.

Figure 1:
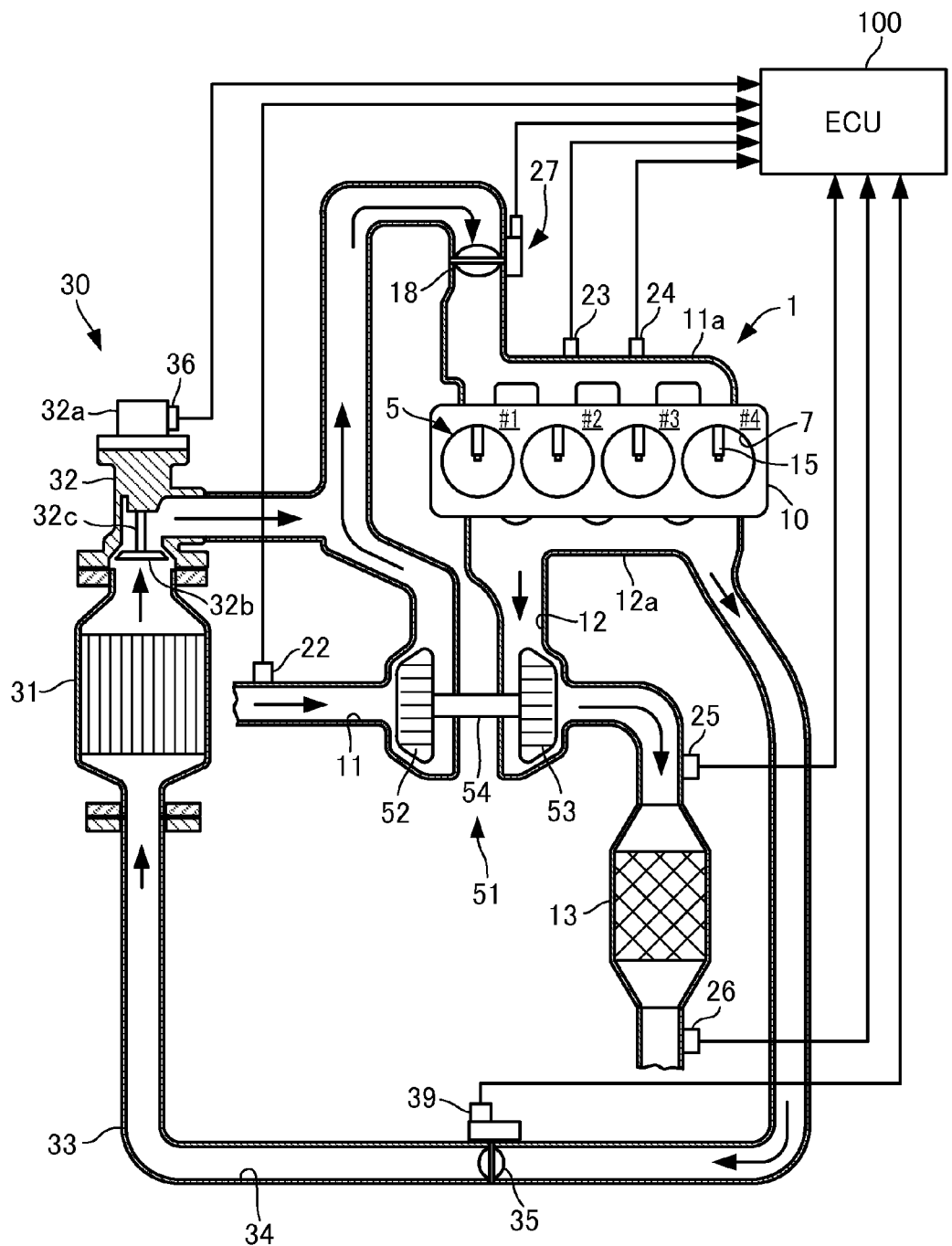
FIG. 1 is a schematic construction view of an exhaust gas recirculation apparatus of an internal combustion engine according to a first embodiment of the present invention.

As shown in FIG. 1, an engine 1 is provided with a cylinder head 10, and a cylinder block not shown, the cylinder head 10 and the cylinder block forming together four cylinders 5. These cylinders form combustion chambers 7, respectively, with pistons received therein. The cylinder head 10 is formed with suction ports for introducing air into the cylinders 5 and exhaust ports for discharging exhaust gas from the cylinders 5.

Each of the suction ports has an injector formed therein to inject fuel which is mixed with air to be introduced into the combustion chamber 7. The cylinder head 10 has ignition plugs 15 each of which serves to ignite the fuel/air mixture introduced into each of the combustion chambers 7. The ignition plugs 15 have respective ignition timings adapted to be controlled by an Electronic Control Unit (hereinafter simply referred to as "ECU") 100 which will hereinafter be described in detail.

The injectors are each partly constructed by an electromagnet valve which is adapted to be opened to inject the fuel to the suction port of each of the cylinders 5 when the electromagnet valve is energized with a predetermined electric pressure by the ECU 100.

The engine 1 further has a suction manifold 11a connected to the cylinder head 10 and having part of an intake passage 11 formed therein. The intake passage 11 is partly formed in a suction pipe 14 to accommodate therein an air cleaner not shown and an air flow meter 22 in this order from the upstream side to the downstream side of the intake passage 11. The intake passage 11 further has a throttle valve 18 disposed at the upstream side of the suction manifold 11a to adjust the amount of intake air. The suction manifold 11a is provided with an intake air temperature sensor 23 and a pressure sensor 24.

The intake passage 11 is further provided with an inter cooler disposed at the downstream side of the air flow meter 22. The inter cooler is operative to perform a forced cooling of the intake air heated by the over-charge of a turbo unit 51 to be described hereinafter. The throttle valve 18 is constituted by an electrically controlled type of opening and closing valve which is capable of steplessly adjusting the opening degree thereof, and is adapted to throttle the passage area of the intake air to adjust the supply amount of the intake air under a predetermined condition. The ECU 100 is operative to control a throttle motor mounted on the throttle valve 18 to adjust the opening degree of the throttle valve 18.

The engine 1 further has an exhaust manifold 12a connected with the cylinder head 10 and forming part of an exhaust passage 12. The exhaust passage 12 is arranged with a catalyst apparatus 13 positioned at the downstream side of the exhaust gas flow of the turbo unit 51 and constituted for example by a three-way catalyst.

The engine 1 is further provided with the turbo unit 51 therein. The turbo unit 51 comprises a turbine wheel 53 to be rotated by the exhaust gas flowing in the exhaust passage 12, a compressor wheel 52 disposed in the intake passage 11, and a rotor shaft 54 connecting the turbine wheel 53 and the compressor wheel 52 with each other. The rotation of the turbine wheel 53 by the exhaust gas discharged from the combustion chamber 7 is transmitted to the compressor wheel 52 through the rotor shaft 54. This making it possible for the engine 1 to have the intake air forced to flow into the combustion chamber 7 not only by the negative pressure generated in response to the movement of the piston but also by the rotation of the compressor wheel 52.

The turbo unit 51 is constructed by a Variable Nozzle Turbo Unit (hereinafter simply referred to as "VNT"), and the ECU 100 is operative to adjust the over-charge pressure of the engine 1 by adjusting the opening degree of a variable nozzle vane mechanism disposed on the side of the turbine wheel 53.

The engine 1 is further provided with an exhaust gas recirculation apparatus (hereinafter simply referred to as "EGR apparatus") 30. The EGR apparatus 30 functions to recirculate part of the exhaust gas flowing in the exhaust passage 12 to the intake passage 11 to supply the exhaust gas as an EGR gas to the combustion chamber 7 of each of the cylinders 5, so that the combustion temperature in the combustion chamber 7 can be lowered and thereby can reduce the amount of NOx to be generated. Further, the pumping loss can be reduced to enhance the fuel consumption of the vehicle.

The EGR apparatus 30 is constructed to connect the intake manifold 11a and exhaust manifold 12a, and is provided with an EGR pipe 33 formed therein with an EGR passage 34. The EGR pipe 33 is provided with an EGR cooler 31 for cooling the EGR gas passing through the EGR passage 34, and an EGR valve 32 in this order from the upstream side of the EGR gas flow.

The EGR valve 32 is provided with a linear solenoid 32a and a shaft 32c disposed therein. The shaft 32c has a base end portion having the linear solenoid 32a arranged to pass therethrough. The free end of the shaft 32c is provided with a valve body 32b operative to open and close the EGR passage 34. The linear solenoid 32a is controlled to selectively be energized or deenergize, so that the shaft 32c is reciprocally and axially driven by the electromagnetic power and the urging power of the spring not shown in the drawings, thereby causing the EGR passage 34 to be opened and closed by the valve body 32b.

The EGR valve 32 according to the present embodiment is constituted by a normally closed valve which is held in the opened state when the linear solenoid 32a is energized, while being held in the closed state when the linear solenoid 32a is deenergized. Here, the EGR valve 32 according to the present embodiment constitutes a second valve as defined in the present invention. The ECU 100 according to the present embodiment constitutes a switching unit as defined in the present invention.

The ECU 100 is adapted to adjust the opening degree of the EGR valve 32 to have the exhaust passage 12 held in communication with the intake passage 11, and thereby to adjust the amount of the EGR gas, i.e., the recirculation amount of the exhaust gas to be introduced into the intake manifold 11a from the exhaust manifold 12a.

The EGR cooler 31 comprises a case, and a cooling water pipe wound around the outer peripheral portion of the EGR passage 34 formed in the case. The EGR gas supplied from the EGR pipe 33 is cooled by the EGR cooler 31 through the heat exchange with the cooling water flowing in the cooling water pipe when the EGR gas passes through the EGR passage 34 formed in the case, and then introduced into the EGR passage 34 at the downstream side of EGR cooler 31.

The EGR apparatus 30 according to the present embodiment is further provided with an EGR shutoff valve 35 in the EGR passage 34 at the upstream side of the EGR cooler 31. The EGR shutoff valve 35 is constituted by a valve such as for example a diaphragm valve and an electromagnet valve which can selectively take an opened state in which the EGR shutoff valve 35 is fully opened or a closed state in which the EGR shutoff valve 35 is fully closed. The EGR shutoff valve 35 is operative to shut off the EGR passage 34 to prevent the exhaust gas discharged to the exhaust manifold 12a from flowing into the EGR apparatus 30 when the EGR valve 32 is in the fully closed state for example at the warm-up operation time of the engine 1. On the other hand, the EGR shutoff valve 35 is operative to take the fully opened state when the EGR valve 32 is not in the fully closed state. The EGR shutoff valve 35, as will be described hereinafter, is adapted to take the fully closed state when the foreign matters are removed during the execution of the foreign matter removal control process, regardless of whether the EGR valve 32 is in the opened state or not.

The EGR shutoff valve 35 may be constituted by a shutoff valve which is capable of having a desired state between the fully opened state and the fully closed state. Here, the above EGR shutoff valve 35 according to the present embodiment constitutes a first valve as defined in the present invention.

Figure 2:
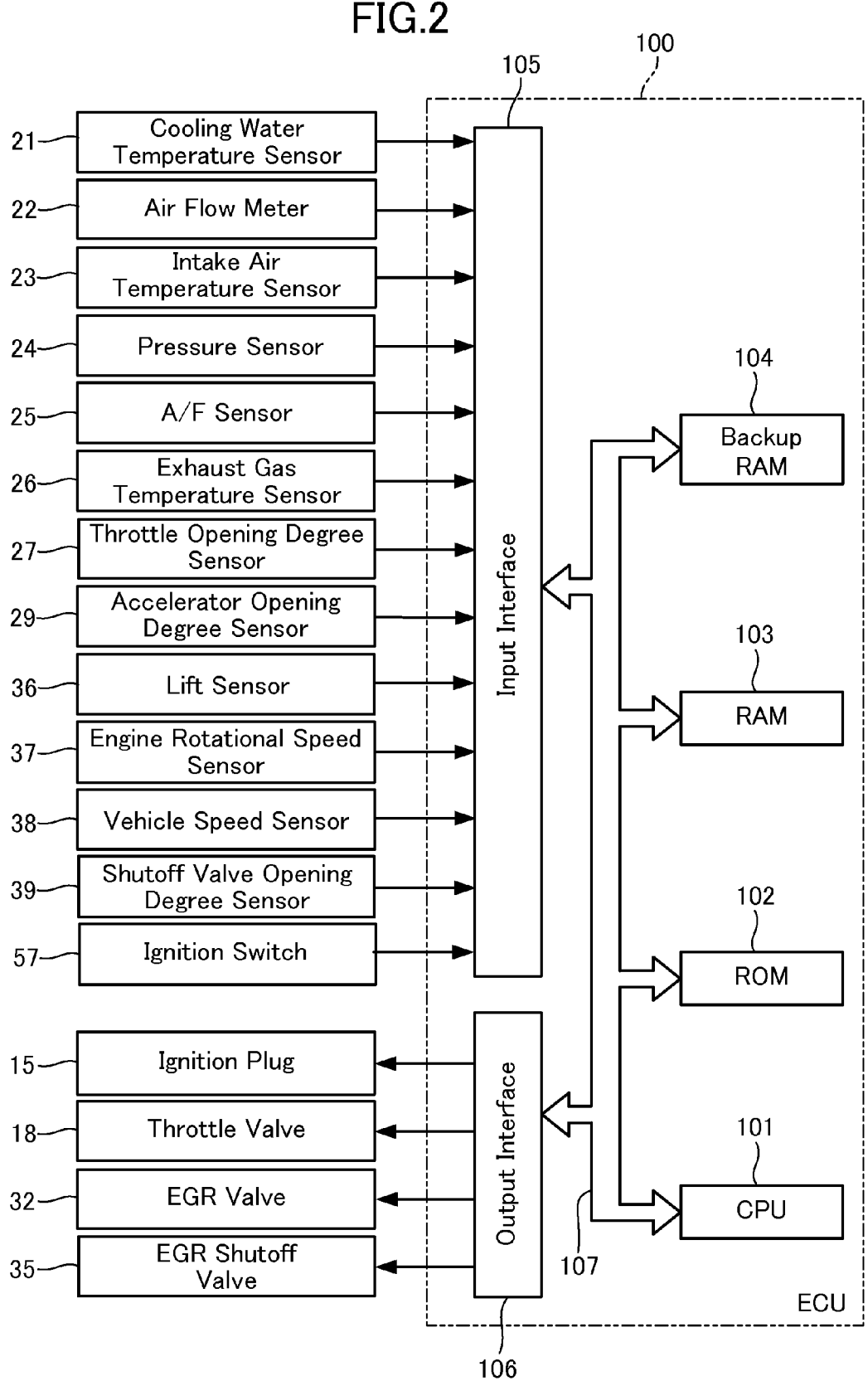
FIG. 2 is a schematic block diagram showing the exhaust gas recirculation apparatus and the peripheral constitutional elements of the exhaust gas recirculation apparatus according to the first embodiment of the present invention.

As shown in FIGS. 1 and 2, the vehicle with the engine 1 according to the present embodiment mounted thereon is provided with a cooling water temperature sensor 21, an air flow meter 22, an intake air temperature sensor 23, a pressure sensor 24, an A/F sensor 25, an exhaust gas temperature sensor 26, a throttle opening degree sensor 27, an accelerator opening degree sensor 29, a lift sensor 36, an engine rotational speed sensor 37, a vehicle speed sensor 38, and a shutoff valve opening degree sensor 39. These sensors are designed to output signals respectively representing the detection results to ECU 100.

The cooling water temperature sensor 21 is mounted on a water jacket formed in the cylinder block of the engine 1 to output a detection signal indicative of a cooling water temperature THW of the engine 1 to the ECU 100. The air flow meter 22 is disposed in the intake passage 11 at the upstream side of the throttle valve 18 to output a detection signal indicative of the intake air amount of air flowing in the intake passage 11 to the ECU 100.

The intake air temperature sensor 23 is disposed in the intake manifold 11a to output a detection signal indicative of the temperature of the intake air in the intake manifold 11a to the ECU 100. The pressure sensor 24 is disposed in the intake manifold 11a to output a detection signal indicative of the pressure of the intake air in the intake manifold 11a to the ECU 100.

The A/F sensor 25 is disposed in the exhaust passage 12 at the upstream side of the catalyst apparatus 13 to output a detection signal indicative of the oxygen concentration in the exhaust gas (exhaust A/F) of the exhaust passage 12 to the ECU 100. The exhaust gas temperature sensor 26 is disposed in the exhaust passage 12 at the downstream side of the catalyst apparatus 13 to output a detection signal indicative of the temperature of the exhaust gas in the exhaust passage 12 to the ECU 100.

The accelerator opening degree sensor 29 is adapted to output a detection signal indicative of the depression amount of an acceleration pedal to the ECU 100, while the throttle opening degree sensor 27 is adapted to output a detection signal indicative of the opening degree of the throttle valve 18 to the ECU 100.

The engine rotational speed sensor 37 is adapted to detect the rotational speed of the crankshaft of the engine 1 to output a detection signal indicative of the rotational speed of the crankshaft to the ECU 100 as the rotational speed of the engine. The vehicle speed sensor 38 is adapted to detect the rotational speed of the wheel to output a detection signal indicative of the rotational speed of the wheel to the ECU 100 as the signal indicative of the vehicle speed.

The lift sensor 36 is provided with a resistance member driven by a direct current, and a brush slidably movable on the surface of the resistance member. The brush is constructed to be integrally operable with the shaft 32c of the EGR valve 32. Further, the brush is adapted to output a voltage signal indicative of the lift position of the shaft 32c, i.e., the opening degree of the EGR valve 32. Therefore, the ECU 100 is capable of detecting the opening degree of the EGR valve 32 with the voltage signal outputted by the brush. This means that the ECU 100 according to the present embodiment constitutes an opening degree detection unit as defined in the present invention. The shutoff valve opening degree sensor 39 is adapted to output a detection signal indicative of the opening degree of the EGR shutoff valve 35 to the ECU 100.

The ECU 100 is shown in FIG. 2 as comprising a central processing unit (hereinafter simply referred to as "CPU") 101, a read only memory (hereinafter simply referred to as "ROM") 102, a random access memory (hereinafter simply referred to as "RAM") 103, and a backup RAM 104. The previously mentioned ECU 100 in the present embodiment constitutes part of the control apparatus according to the present invention.

The ROM 102 is adapted to memorize various kinds of programs including a program for executing the control of the exhaust gas circulation amount and the control of the foreign matter removal to be described hereinafter, and a control program for controlling the fuel injection amount to the cylinder 5, and a map to be referred to at the time of executing the above control programs. The CPU 101 is adapted to execute various kinds of arithmetic processing based on the various kinds of control programs and the map memorized in the ROM 102. Further, the RAM 103 is adapted to temporarily memorize the results of arithmetic processing performed by the CPU 101, and the data and the like inputted from the above sensors. The backup RAM 104 is constituted by a non-volatile memory to memorize the data and the like to be stored for example at the time of stopping the engine 1.

The CPU 101, the ROM 102, the RAM 103, and the backup RAM 104 are connected with one another through a bus 107, and connected with an input interface 105 and an output interface 106.

The input interface 105 is connected with the cooling water temperature sensor 21, the air flow meter 22, the intake air temperature sensor 23, the pressure sensor 24, the A/F sensor 25, the exhaust gas temperature sensor 26, the throttle opening degree sensor 27, the accelerator opening degree sensor 29, the lift sensor 36, the engine rotational speed sensor 37, the vehicle speed sensor 38, and the shutoff valve opening degree sensor 39. Here, the vehicle may be provided with an additional ECU other than the previously mentioned ECU 100 to allow the signals outputted from at least some of the sensors to be inputted to the ECU 100 through the additional ECU.

The output interface 106 is connected with the sensors of the throttle valve 18, the EGR valve 32, the EGR shutoff valve 35, and the injector.

And, the ECU 100 is operative to perform various controls of the engine 1, such as the exhaust gas recirculation control, the fuel injection amount control, the foreign matter removal control and the like, based on the signals outputted from various sensors.

The characteristic structure of the ECU 100 partly constituting the control apparatus according to the present embodiment of the present invention will be described hereinafter with reference to FIGS. 1 and 2.

The ECU 100 is operative to judge whether or not the engine 1 is in the warm-up operation based on the signal inputted from the cooling water temperature sensor 21. This means that the ECU 100 according to the present embodiment constitutes a detection unit as defined in the present invention. The ECU 100 is operative to switch the EGR shutoff valve 35 from the fully closed state to the fully opened state when the ECU 100 judges that the temperature of the cooling water is equal to or higher than the predetermined threshold value. The predetermined threshold value is set to the temperature, for example, 70 degrees Celsius, generally indicating that the warm-up operation of the engine 1 has been finished. On the other hand, the ECU 100 is operative to switch the EGR shutoff valve 35 to the fully closed state when the ECU 100 judges that the temperature of the cooling water is lower than the predetermined threshold value.

The control apparatus according to the present embodiment thus constructed can suppress the EGR gas from being flowed into the EGR passage 34 at the downstream side of the EGR shutoff valve 35 during the warm-up operation of the engine 1, thereby making it possible to suppress the EGR gas from being cooled in the EGR apparatus 30 and thereby to suppress condensed water from being generated.

The ECU 100 is further operative to monitor the variation of the negative pressure on the condition that the warm-up operation of the engine 1 is finished and the fuel cut control is being performed during the deceleration of the vehicle.

More concretely, the ECU 100 is operative to start monitoring the variation of the intake pressure, i.e., the variation of the negative pressure in the intake manifold 11a, and to judge whether or not the foreign matter is caught when the ECU 100 judges that the signal inputted from the accelerator opening degree sensor 29 is indicative of the fully closed state of the accelerator opening degree and that the operation state of the vehicle enters the fuel cut execution area based on the signals inputted from the engine rotational speed sensor 37 and the vehicle speed sensor 38. The fuel cut execution area is preliminarily memorized in ROM 102 as a fuel cut area map associated with the vehicle speed and the engine rotational speed.

For the aforementioned monitoring of the variation of the negative pressure, the ECU 100 is operative to fully open the EGR shutoff valve 35 in the first place, and then to fully close the EGR valve 32, so as to obtain the signal Pclose indicative of the EGR gas pressure from the pressure sensor 24.

Further, the ECU 100 is designed to drive the EGR valve 32 to the fully opened state while keeping the EGR shutoff valve 35 fully opened and to obtain from the pressure sensor 24 the signal Popen indicative of the intake pressure at the fully opened state of the EGR valve 32. Then thereafter, the ECU 100 is operative to calculate the difference delta P between the Pclose and Popen and to determine whether or not the delta P is larger than a threshold value Pth1.

The ECU 100 is designed to determine that there is the variation of the negative pressure amount in response to the variation of the EGR valve 32 and that the foreign matter is not caught in the EGR valve 32, if the delta P is larger than the threshold value Pth1. On the other hand, however, the ECU 100 is designed to determine that the negative pressure is not decreased even though the EGR valve 32 is driven to the fully closed state, due to the foreign matters caught by the EGR valve 32, if the delta P is equal to or smaller than the threshold value Pth1. This means that the ECU 100 in the present embodiment constitutes the foreign matter detection unit of the present invention.

Here, the threshold value Pth1, which depends on the structure of the engine 1, has been predetermined through the experimental measurements. More concretely, the threshold value Pth1 is judged to be the value approximately 10% smaller than the smallest value among a plurality of delta Ps each measured in association with each of a plurality of engine rotational speeds.

The way to determine the threshold value Pth1 is not limited to the way as previously explained, and further the threshold value Pth1 may otherwise be determined through a calculation by a simulation software, instead of the experimental measurements.

The ECU 100 is designed to start the foreign matter removal control when the ECU 100 judges that the foreign matter is caught in the EGR valve 32. More specifically, the ECU 100 is operative to first switch the EGR shutoff valve 35 to the fully closed state. This means that the ECU 100 in the present embodiment constitutes the switching unit of the present invention.

Then, the ECU 100 is operative to drive the EGR valve 32 to the fully opened state and then subsequently to the fully closed state in order to remove the foreign matters adhered to the EGR valve 32. More specifically, the EUC 100 is operative to repeatedly drive the EGR valve 32 between the fully opened state and the fully closed state, to promote the removal of the foreign matters adhered to the EGR valve 32.

During the operation of the aforementioned foreign matter removal control, the EGR shutoff valve 35 is kept in the fully closed state, not to allow the exhaust gas to flow into the EGR apparatus 30. Therefore, even though the fuel cut operation is finished during the execution of the foreign matter removal control and the combustion of the fuel is resumed in each of the combustion chambers 7, the foreign matters can be removed under the state where the influence to the combustion state due to the flow of the EGR gas into the intake port is being suppressed.

Once the foreign matter removal control is finished, on the condition that the internal combustion engine is under the fuel cut operation, the ECU 100 is operative to obtain from the pressure sensor 24 the Popen and the Pclose, which are the intake pressures at the EGR valve 32 in the fully opened state and in the fully closed state, respectively, to calculate the difference delta P between the Popen and Pclose, and to judge whether or not the foreign matters have been removed by judging whether or not the delta P is greater than the threshold value Pth1. And, when the delta P is smaller than the threshold value Pth1, the ECU 100 is operative to judge that the foreign matters have not been removed and further repeat the foreign matter removal control. On the other hand, when the delta P is equal to or greater than the threshold value Pth1, the ECU 100 is operative to judge that the removal of the foreign matters have been completed and resume the exhaust gas recirculation amount control.

The ECU 100, as described above, may otherwise be operative to switch the EGR shutoff valve to the fully closed state independently of the foreign matter removal control, when the ECU 100 judges that the foreign matter is caught, thereby making it possible to flexibly set the start timing of the foreign matter removal control, as well as to prevent an accidental fire from being generated due to an excessive recirculation of the EGR gas into the intake passage at the time when the fuel cut operation is finished.

Next, the foreign matter removal control process according to the present embodiment will be described hereinafter with reference to the FIG. 3. The process to be described hereinafter is executed at a predetermined timing by the CPU 101 which is constituting the ECU 100, on the condition that the warm-up operation of the engine 1 is finished, and the process realizes a program that can be executed by the CPU 101. A predetermined timing, for example, may be such a frequency that the program is executed once per one trip from the ignition ON to the ignition OFF.

Figure 3:
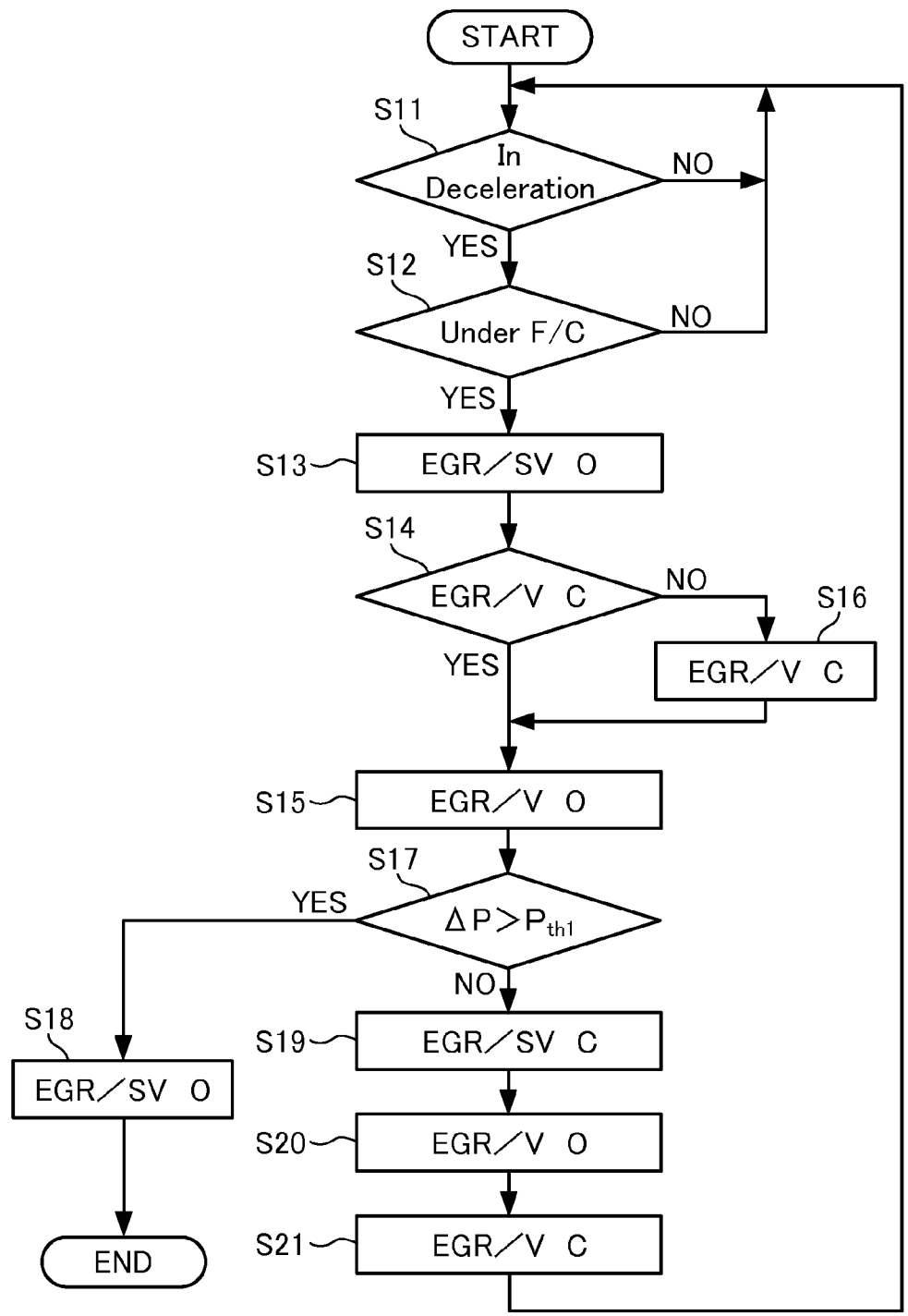
FIG. 3 is a flow chart for explaining a foreign matter removal control according to the first embodiment of the present invention.

In the FIG. 3, "EGR/V", "EGR/SV", "C", and "O" represent the EGR valve 32, the EGR shutoff valve 35, the fully closed state, and the fully opened state, respectively.

As shown in FIG. 3, the ECU 100 is operative to judge whether or not the vehicle is being accelerated, based on the signal inputted from the accelerator opening degree sensor 29 (Step S11). To be more concrete, the ECU 100 is operative to judge that the vehicle is being decelerated if the signal inputted from the accelerator opening degree sensor 29 indicates the fully closed state of accelerator.

The ECU 100 is moved to the step S12, if the vehicle is judged to be being decelerated ("YES" at the step S11). On the other hand, the ECU 100 is moved back to the START, if the vehicle is not judged to be being decelerated ("NO" at the step S11).

Next, the ECU 100 is operative to judge whether or not the vehicle is under the fuel cut operation (Step S12). To be concrete, the ECU 100 is operative to judge whether or not the state of the vehicle operation is in the predetermined fuel cut area, based on the signals respectively inputted from the engine rotational speed sensor 37 and the vehicle speed sensor 38 and on the fuel cut area map memorized in the ROM 102.

The ECU 100 is moved to the step S13, if the vehicle is judged to be under the fuel cut operation ("YES" at the step S12). On the other hand, the ECU 100 is moved back to the START, if the vehicle is not judged to be under the fuel cut operation ("NO" at the step S12).

Next, the ECU 100 is operative to switch the EGR shutoff valve 35 to the fully opened state (Step S13). Then, the ECU 100 is operative to judge whether or not the EGR valve is in the fully closed state (Step S14). More concretely, the ECU 100 is operative to judge whether or not the current opening degree of the EGR valve 32 indicates the fully closed state based on the signal inputted from the lift sensor 36.

The ECU 100 is operative to obtain from the pressure sensor 24 the Pclose, which is the intake pressure at the time when the EGR valve 32 is in the fully closed state, and the ECU 100 is moved to the step S15, if the EGR valve 32 is judged to be in the fully closed state ("YES" at the step S14). On the other hand, when the EGR valve 32 is judged to be not in the fully closed state ("NO" at the step S14), the ECU 100 is operative to drive the EGR valve 32 to the fully closed state (Step S16), and then to obtain from the pressure sensor 24 the Pclose, which is the intake pressure at the fully closed state of the EGR valve 32, and then is moved to the step 15.

Next, the ECU 100 is operative to drive the EGR valve 32 to the fully opened state (Step S15) and then to obtain from the pressure sensor 24 the Popen, which is the intake pressure at the fully opened state of the EGR valve 32.

Next, the ECU 100 is operative to calculate the delta P which is the difference between the Pclose and the Popen, and then to compare the delta P to the threshold value Pth1 (Step S17).

The ECU 100 is moved to the step S19 in order to remove the foreign matters being caught in the EGR valve 32, when the delta P has been judged to be equal to or smaller than the threshold value Pth1 ("NO" at the step S17). On the other hand, when the delta P is judged to be larger than the threshold value Pth1 ("YES" at the step S17), then the ECU 100 is operative to switch the EGR shutoff valve 35 to the fully opened state because there is no biting of the foreign matters generated, and then the ECU 100 is moved to the END. Through the process as previously explained, the ECU 100 is switched to the normal exhaust gas recirculation amount control where the opening degree of the EGR valve 32 is controlled in response to the combustion state of the engine 1.

Once moved to the step S19, the ECU 100 is operative to switch the EGR shutoff valve 35 to the fully closed state and to drive the EGR valve 32 to the fully opened state (Step S20), and subsequently to drive the EGR valve 32 back to the fully closed state (Step S21).

Thereafter, the ECU 100 is returned to the step S11 again, where the ECU 100 is operative to compare the delta P, which is the difference between the Popen and the Pclose, to the threshold value Pth1, and to judge whether or not the foreign maters are removed.

As previously described, the control apparatus of the internal combustion engine according to the first embodiment of the present invention is designed to switch the EGR shutoff valve 35 from the opened state to the closed state when the foreign matters have been detected to be adhered to the EGR valve 32, so that the EGR gas will not be flowed into the intake passage even if the foreign matters are caught in the EGR valve 32, thereby making it possible to suppress the deterioration of the combustion of the engine 1 due to the flow-in of the EGR gas from being generated. And consequently, the catalyst damage and the like can be suppressed as well as the rotational fluctuations and the engine stalls of the engine 1 can be suppressed.

The ECU 100 is capable of removing the foreign matters such as the deposits by driving the EGR valve 32 between the opened state and the closed state during the operation of the engine 1. Still further, the ECU 100 is designed to switch the EGR shutoff valve 35 from the opened state to the closed state when the EGR valve 32 has been adhered to by the foreign matters, so as to suppress the EGR gas from flowing into the EGR passage 34 by the EGR shutoff valve 35 when the EGR valve 32 is driven between the opened state and the closed state. And consequently, there is no abrupt increase of the EGR gas when the foreign matters are being removed, thereby making it possible to suppress the deterioration of the combustion of the engine 1.

In addition, the ECU 100 is capable of precisely detecting that the foreign matters are adhered to the EGR valve 32 based on the variation of the pressure of the EGR gas. And, the ECU 100 is operative to detect that the foreign matters are adhered to the EGR valve 32 during the fuel cut operation of the engine 1, thereby making it possible to detect whether or not the foreign matters are adhered to the EGR valve 32 in the state where the influence to the combustion state of the engine 1 due to the variation of the EGR gas flow amount is suppressed.

Further, the ECU 100 is capable of shutting off the EGR gas flowing in the downstream side of the EGR shutoff valve 35 when the cooling water temperature is lower than the threshold value, thereby making it possible to suppress the condensed water from being generated in the vicinity of the EGR valve 32.

The ECU 100 is operative to switch the EGR shutoff valve 35 from the closed state to the opened state when the cooling water temperature is equal to or greater than the threshold value, so that the EGR gas can be supplied to the EGR passage 34, thereby making it possible to circulate the EGR gas into the intake passage 11 in response to the opened state and the closed state of the EGR valve 32.

The ECU 100 is operative to drive the EGR valve 32 so that the EGR valve 32 repeatedly take the opened state and the closed state, thereby making it possible to remove the foreign matters such as the deposits accumulated on the EGR valve 32.

The foregoing explanation is directed to the case that there are generated the foreign matters being caught in the EGR valve 32 and consequently the EGR valve 32 is not driven to the fully closed state. However, the foreign matter removal control process according to the present embodiment as shown in the FIG. 3 can be applied as well when the EGR valve 32 is not fully opened due to the foreign matters being caught in the EGR valve 32, because the delta P which is the difference between the Popen and the Pclose becomes smaller than in normal cases.

The foregoing description explained about the case that the foreign matters being caught in the EGR valve 32 are detected through the monitoring of the negative pressure variation during the deceleration and the fuel cut operation of the vehicle. However, the foreign matters being caught in the EGR valve 32 may also be detected other than during the deceleration or the fuel cut operation of the vehicle, by constantly monitoring the intake pressure in the intake manifold 11a as explained hereinafter as the second embodiment of the present invention.

The control apparatus according to the second embodiment of the present invention will be described hereinafter with reference to the FIGS. 1, 2 and 4.

The control apparatus of the internal combustion engine according to the second embodiment will be explained hereinafter with the constitution parts and elements forming the second embodiment bearing the same reference numerals as those of the first embodiment, and will be explained especially only about the different aspects in detail hereinafter.

The vehicle having the ECU 100 according to the present embodiment mounted thereon includes an ignition switch 57. The ECU 100 is operative to judge whether or not the ignition system is in the state of ignition on (IG-ON) where the ignition system is electrically turned on, based on the signal inputted from the ignition switch 57. When the ECU 100 judges that the ignition system is in the state of ignition on, the ECU 100 is operative to detect the EGR output pressure P_EGRO regardless of whether or not the vehicle is being decelerated or under the fuel cut operation. In the present embodiment, the explanation is made about the case where the ECU 100 is adapted to detect the intake pressure in the intake manifold 11a as the EGR output pressure P_EGRO based on the signal inputted by from the pressure sensor 24.

Further, the ECU 100 is operative to memorize in the ROM 102 the intake pressure map associating the engine rotational speed, the engine load and the opening degree of the EGR valve 32 with a threshold value Pth2 of the EGR output pressure P_EGRO. The threshold value Pth2 is calculated by adding the value of the intake pressure usually generated at the intake manifold 11a when there are not generated the foreign matters being caught in the EGR valve 32 and the value of the margin for avoiding the erroneous detection due to the measurement errors. The value of the intake pressure usually generated is predetermined through the experimental measurements of the engine rotational speed, the engine load and the opening degree of the EGR valve 32. Therefore, the EGR output pressure P_EGRO becomes greater than the threshold value Pth2 when there are the foreign matters being caught in the EGR valve 32.

The ECU 100 is operative to determine that there are generated the foreign matters being caught in the EGR valve 32, when the ECU 100 judges that the value detected by the pressure sensor 24 is greater than the threshold value Pth2.

The ECU 100, as well as in the case of the first embodiment, is operative to operate the EGR shutoff valve 35 to the fully closed state and to drive the EGR valve 32 to the fully opened state and then subsequently to the fully closed state so as to remove the foreign matters being caught in the EGR valve 32, when the ECU 100 judges that there are generated the foreign matters being caught in the EGR valve 32. Therefore, even though the fuel cut operation is finished during the execution of the foreign matter removal control and the combustion of the fuel is resumed in each of the combustion chambers 7, the foreign matters can be removed under the state where the EGR gas is being suppressed from flowing into the intake port, in other words, where the influence to the combustion state is being suppressed.

Next, the foreign matter removal control process according to the present embodiment will be described hereinafter with reference to the FIG. 4. The process to be described hereinafter is executed at a predetermined timing by the CPU 101 which is constituting the ECU 100, on the condition that the warm-up operation of the engine 1 is finished, and the process realizes a program that can be executed by the CPU 101. A predetermined timing, for example, is such a frequency that the program is executed once per one trip from the ignition ON to the ignition OFF.

Figure 4:
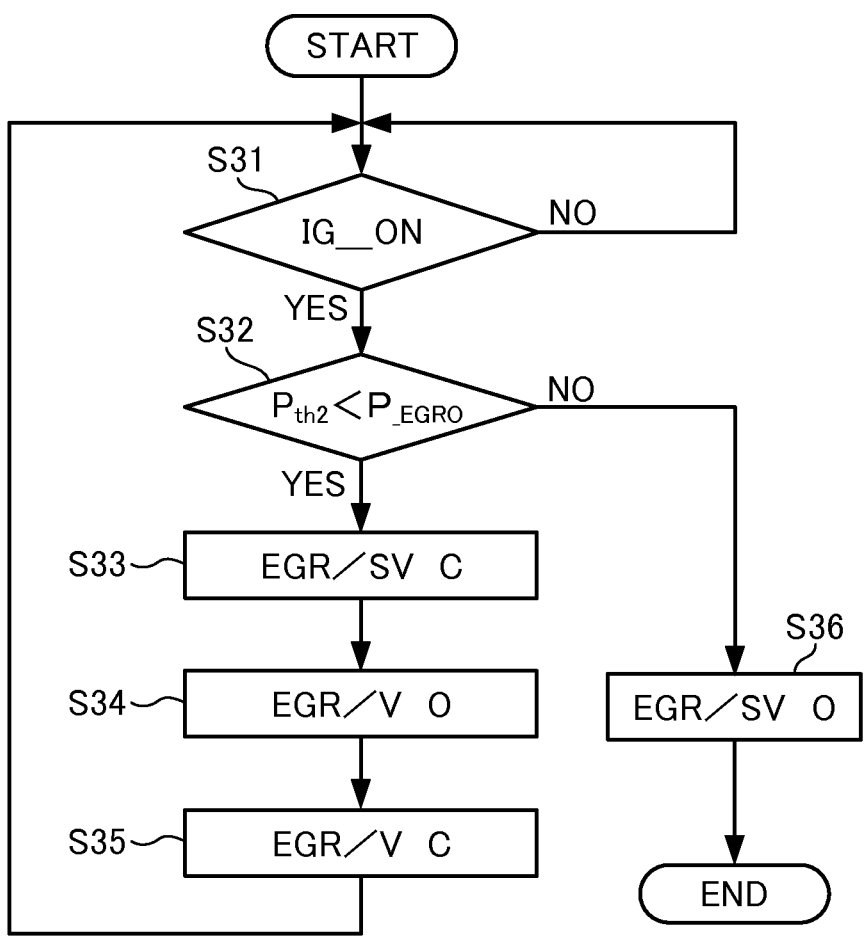
FIG. 4 is a flow chart for explaining the foreign matter removal control according to a second embodiment of the present invention.

In the FIG. 4, "EGR/V", "EGR/SV", "C", and "O" represent the EGR valve 32, the EGR shutoff valve 35, the fully closed state, and the fully opened state, respectively.

As shown in the FIG. 4, the ECU 100 is operative to judge whether or not the ignition system is in the state of ignition ON, based on the signal inputted from the ignition switch 57 (Step S31).

The ECU 100 is moved to step S32 if the ECU 100 judges that the ignition system is in the state of ignition ON ("YES" at the step S31). On the other hand, the ECU 100 is operative to be returned to the START, if the ECU 100 judges that the ignition system is not in the state of ignition ON ("NO" at the step S31)

Next, the ECU 100 is operative to judge whether or not the EGR output pressure P_EGRO is greater than the threshold value Pth2 (Step S32). To be more concrete, the ECU 100 is operative to calculate the engine rotational speed and the engine load based on the signal inputted from the engine rotational speed sensor 37 and the air flow meter 22, and to judge whether or not the EGR output pressure P_EGRO is greater than the threshold value Pth2, with reference to the EGR output pressure map memorized in the ROM 102.

The ECU 100 is moved to the step 33, when the ECU 100 judges that the EGR output pressure P_EGRO is greater than the threshold value Pth2 ("YES" at the step S32). On the other hand, the ECU 100 is operative to judge that there are not generated the foreign matters being caught in the EGR valve 32 and to switch the EGR shutoff valve 35 to the fully opened state (Step S36) and is moved to the END, when the ECU 100 judges that the EGR output pressure P_EGRO is equal to or lower than the threshold value Pth2 ("NO" at the step S32).

Meanwhile, when the ECU 100 is moved to step S33, the ECU 100 is operative to switch the EGR shutoff valve 35 to the fully closed state in order to remove the foreign matters being caught in the EGR valve 32. Then thereafter, the ECU 100 is operative to drive the EGR valve 32 to the fully opened state (Step S34), and subsequently to the fully closed state (Step S35).

Next, the ECU 100 is operative to be moved to step S31, to compare the EGR output pressure P_EGRO with the threshold value Pth2 on the condition that the ignition system is in the state of ignition ON, and to judge whether or not the foreign matters are removed.

As previously mentioned, the control apparatus of the internal combustion engine according to the second embodiment of the present invention is operative to set the value of the intake pressure usually generated when there are not the foreign matters adhered to the EGR valve 32, as the predetermined value, thereby making it possible to precisely detect that there are the foreign matters adhered to the EGR valve 32 based on the EGR gas pressure.

The above explanation has been directed to the case in which the ECU 100 is operative to judge whether or not the ignition system is in the state of ignition on based on the signal inputted from the ignition switch 57. However, the ECU 100 may be designed to judge whether or not the ignition system is in the state of ignition on based on the signal inputted from another ECU connected each other with the power switch which may be disposed in the vehicle, the power switch allowing the vehicle to selectively take either one of the states of Power Off, ACC and IG-ON in response to the operation by the driver.

While the above explanation has been directed to the case that the ECU 100 is operative to judge that there are generated the foreign matters being caught in the EGR valve 32 when the EGR output pressure P_EGRO is greater than the threshold value Pth2, on the condition that the ignition system is in the state of ignition on, however, as will be explained hereinafter as the third embodiment of the present invention, the ECU 100 may otherwise be operative to detect the foreign matter being caught in the EGR valve 32 based on whether or not there is generated the accidental fire.

The control apparatus according to the third embodiment of the present invention will be described hereinafter with reference to the FIGS. 1, 2 and 5.

The control apparatus of the internal combustion engine according to the third embodiment will be explained hereinafter with the constitution parts and elements forming the third embodiment bearing the same reference numerals as those of the first embodiment, and will be explained especially only about the different aspects in detail hereinafter.

When the ECU 100 judges that ignition system is in the state of ignition on based on the signal inputted from the ignition switch 57, the ECU 100 is operative to judge whether or not there is generated the accidental fire in any one of the cylinders 5.

For example, the accidental fire may be judged to have been generated in the cylinder whose 180 degree CA time exceeds the predetermined time, when the 180 degree CA time exceeds the predetermined time in either one of the cylinders 5, where the 180 degree CA time is calculated to be the time required for the crankshaft to rotate the predetermined angle in the combustion cycle of each of the cylinders 5. The predetermined time may be set based on the average value of the 180 degree CA time of all of the cylinders 5. Otherwise, the ECU 100 may reference the 180 degree CA time corresponding to the engine rotational speed at the time of the judgment of the generation of the accidental fire, where the correspondence between the engine rotational speed and the 180 degree CA time in the state that there is generated no accidental fire has been set forth in advance through the experimental measurements.

When the ECU 100 has judged that there is the accidental fire generated in any one of the cylinders 5, the EUC 100 is operative to perform the foreign matter removal control process as described in the first embodiment, because there may be generated the foreign matter being caught in the EGR valve 32.

Next, the foreign matter removal control process according to the present embodiment will be described hereinafter with reference to the FIG. 5. The process to be described hereinafter is executed at a predetermined timing by the CPU 101 which is constituting the ECU 100, on the condition that the warm-up operation of the engine 1 is finished, and the process realizes a program that can be executed by the CPU 101. A predetermined timing, for example, is such a frequency that the program is executed once per one trip from the ignition ON to the ignition OFF.

Figure 5:
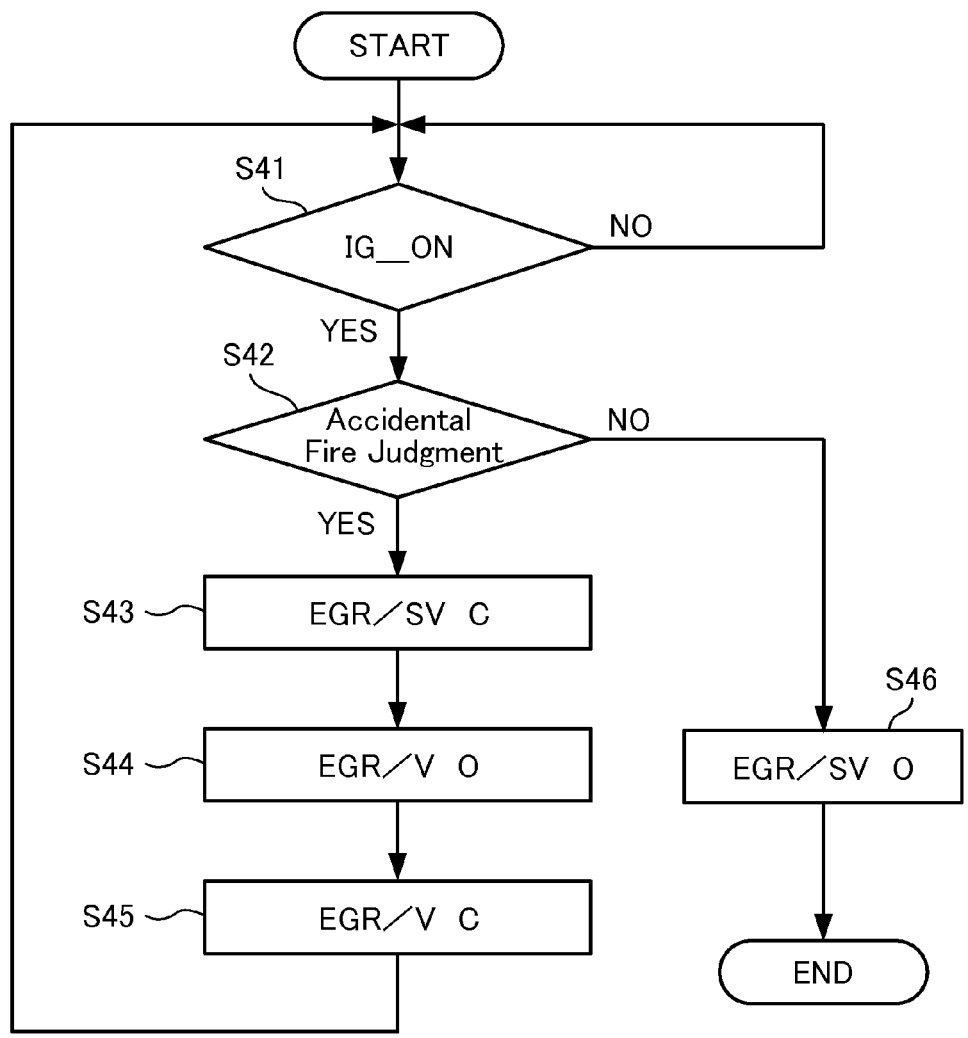
FIG. 5 is a flow chart for explaining the foreign matter removal control according to a third embodiment of the present invention.

In the FIG. 5, "EGR/V", "EGR/SV", "C", and "O" represent the EGR valve 32, the EGR shutoff valve 35, the fully closed state, and the fully opened state, respectively.

As shown in the FIG. 5, the ECU 100 firstly judges whether or not the ignition system is in the state of ignition on based on the signal inputted from the ignition switch 57 (Step S41).

The ECU 100 is operative to be moved to the step S42, when the EUC 100 judges that the ignition system is in the state of ignition on ("YES" at the step S41). On the other hand, the ECU 100 is operative to be returned to the START, when the EUC 100 judges that the ignition system is not in the state of ignition on ("NO" at the step S41).

Next, the ECU 100 is operative to judge whether or not there is generated the accidental fire in any one of the cylinders 5 (Step S42). More concretely, the ECU 100 is operative to calculate the 180 degree CA time in the combustion cycle of either one of the cylinders 5 based on the signal inputted from the engine rotational speed sensor 37, and to judge that there is generated the accidental fire when the 180 degree CA time exceeds the predetermined time.

The ECU 100 is operative to be moved to the step S43, when the ECU 100 judges that there is generated the accidental fire in any one of the cylinders 5 ("YES" at the step S42). On the other hand, the ECU 100 is operative to judge that there are not generated the foreign matters being caught in the EGR valve 32 and to switch the EGR shutoff valve 35 to the fully opened state and is moved to the END, when the ECU 100 judges that there is not generated the accidental fire in either one of the cylinders 5 ("NO" at the step S42).

The ECU 100 is operative to switch the EGR valve 35 to the fully closed state in order to remove the foreign matters being caught in the EGR valve 32, when the ECU 100 is moved to the step S43. Then thereafter, the ECU 100 is operative to drive the EGR valve 32 to the fully opened state (Step S44), and subsequently to the fully closed state (Step S45).

Then, the ECU 100 is operative to be returned to the step S41 and to judge whether or not the foreign matters being caught are removed based on the aforementioned judgment with respect to the accidental fire, on the condition that the ignition system is in the state of ignition on.

As previously mentioned, the control apparatus of the internal combustion engine according to the third embodiment of the present invention is operative to precisely detect that the foreign matters adhered to the EGR valve 32 based on whether or not there is generated an accidental fire in the engine 1.

Although the above explanation has been made to the case that the ECU 100 is operative to judge that there are generated the foreign matters being caught in the EGR valve 32 when there is generated an accidental fire in either one of the cylinders 5, however, the ECU 100 may otherwise be so constituted to judge that there are generated the foreign matters being caught in the EGR valve 32 based on the lift amount of the EGR valve 32, as will be described hereafter as the fourth embodiment of the present invention.

The control apparatus according to the fourth embodiment of the present invention will be described hereinafter with reference to the FIGS. 1, 2 and 6.

The control apparatus of the internal combustion engine according to the fourth embodiment will be explained hereinafter with the constitution parts and elements forming the fourth embodiment bearing the same reference numerals as those of the first embodiment, and will be explained especially only about the different aspects in detail hereinafter.

The ECU 100 according to the present embodiment is operative to obtain from the lift sensor 36 the signal indicative of a real opening degree VRreal when the ECU 100 judges that the ignition system is in the state of ignition on based on the signal inputted from the ignition switch 57, and to refer a designated opening degree VRtarget which is the opening degree currently designated with respect to the EGR valve 32. The ECU 100 is operative to judge that there are generated the foreign matters being caught in the EGR valve 32 when the real opening degree VRreal of the EGR valve 32 is greater than a reference value VRref.

Here, the reference value VRref is set to the value obtained by adding the margin, corresponding to the detection error of the lift sensor 36 or the like, to the designated opening degree VRtarget, which is the designated opening degree with respect to the EGR valve 32.

The ECU 100 is constituted to perform the foreign matter removal control process as described in the first embodiment, when the real opening degree VRreal is greater than the reference value VRref and therefore there may be generated the foreign matter being caught in the EGR valve 32.

Next, the foreign matter removal control process according to the present embodiment will be described hereinafter with reference to the FIG. 6. The process to be described hereinafter is executed at a predetermined timing by the CPU 101 which is constituting the ECU 100, on the condition that the warm-up operation of the engine 1 is finished, and the process realizes a program that can be executed by the CPU 101. A predetermined timing, for example, is such a frequency that the program is executed once per one trip from the ignition on to the ignition off.

Figure 6:
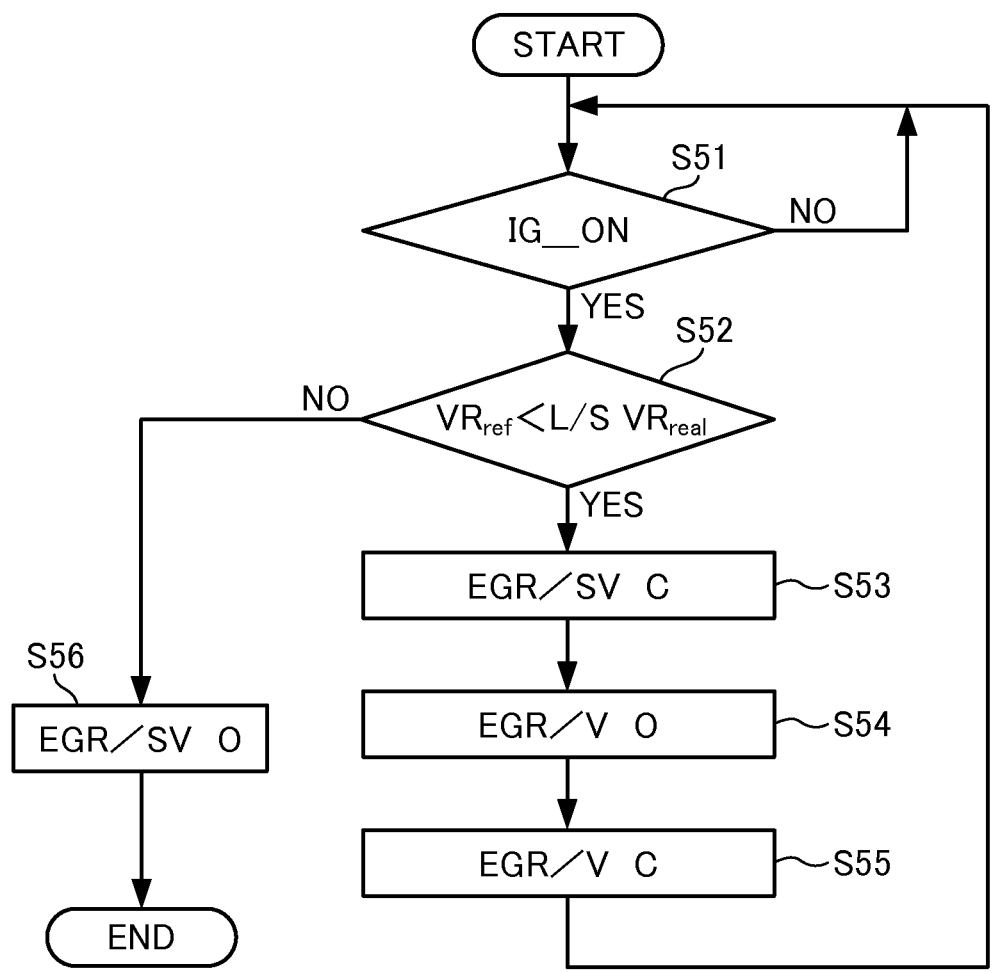
FIG. 6 is a flow chart for explaining the foreign matter removal control according to a fourth embodiment of the present invention.

In the FIG. 6, "EGR/V", "EGR/SV", "C", and "O" represent the EGR valve 32, the EGR shutoff valve 35, the fully closed state, and the fully opened state, respectively.

As shown in the FIG. 6, the ECU 100 firstly judges whether or not the ignition system is in the state of ignition on based on the signal inputted from the ignition switch 57 (Step S51).

The ECU 100 is operative to be moved to the step S52, when the EUC 100 judges that the ignition system is in the state of ignition on ("YES" at the step S51). On the other hand, the ECU 100 is operative to be returned to the START, when the EUC 100 judges that the ignition system is not in the state of ignition on ("NO" at the step S51).

Next, the ECU 100 is operative to judge whether or not the real opening degree VRreal is greater than the reference value VRref (Step S52). More concretely, the ECU 100 is operative to obtain the real opening degree VRreal of the EGR valve 32 based on the signal inputted from the lift sensor 36. Further, the ECU 100 is operative to reference the designated opening degree VRtarget, which is currently designated with respect to the EGR valve 32, and to calculate the reference value VRref by adding a margin to the designated opening degree VRtarget. The ECU 100 is operative to judge that there are generated the foreign matters being caught in the EGR valve 32, when the real opening degree VRreal is greater than the reference value VRref.

The ECU 100 is operative to be moved to the step S53 when the ECU 100 judges that the real opening degree VRreal is greater than the reference value VRref ("YES" at the step S52). On the other hand, the ECU 100 is operative to judge that there are not generated the foreign matters being caught in the EGR valve 32, to switch the EGR shutoff valve 35 to the fully opened state (Step S56), and to be moved to the END, when the ECU 100 judges that the real opening degree VRreal is equal to or smaller than the reference value VRref ("NO" at the step S52).

The ECU 100 is operative to switch the EGR shutoff valve 35 to the fully closed state in order to remove the foreign matters being caught in the EGR valve 32, when the ECU 100 is moved to the step S53. Then thereafter, the ECU 100 is operative to drive the EGR valve 32 to the fully opened state (Step S54), and subsequently to the fully closed state (Step S55).

Next, the ECU 100 is operative to be returned to the step S51 and judge whether or not the foreign matters are removed by comparing the real opening degree VRreal of the EGR 32 and the reference opening degree VRref on the condition that the ignition system is in the state of ignition on.

As previously mentioned, the control apparatus of the internal combustion engine according to the fourth embodiment of the present invention is operative to precisely detect that there is the foreign matter adhered to the second valve, based on the difference between the designated opening degree and the opening degree detected by the opening degree detection unit.

Although the explanation has been made about the case that the EGR apparatus 30 constitutes what is called the HPL (High-Pressure Loop) where the EGR apparatus 30 is operative to obtain the exhaust gas from the upstream side of the turbine wheel 53 and recirculate the obtained exhaust gas into the downstream side of the compressor wheel 52, the present invention is not limited to this case, but the EGR apparatus 30 may otherwise constitute the LPL (Low-Pressure Loop) where the EGR apparatus 30 is operative to obtain the exhaust gas from the downstream side of the turbine wheel 53 and recirculate the obtained exhaust gas into the upstream side of the compressor wheel 52.

Further, although the above explanation has been made about the case that the ECU 100 is operative to perform the foreign matter removal control process when the engine 1 has finished the warm-up operation, the present invention is not limited to this case, but the ECU 100 may otherwise be so constructed to perform the foreign matter removal control process all the time and to judge whether or not the engine 1 has finished the warm-up operation during the time when the foreign matter removal control process is being performed.

Further, although the above explanation has been made about the case that the EGR apparatus 30 is applied to the engine 1 provided with the turbo unit 51, the present invention is not limited to this case, but the EGR apparatus 30 may otherwise be applied to the engine 1 not provided with the turbo unit 51, as well.

Although the above explanation has been made about the case that the EGR apparatus 30 is applied to the vehicle with the engine 1 mounted thereon and constructed by a gasoline engine, the present invention is not limited to this case, but the EGR apparatus 30 may otherwise be mounted on the vehicle with the publicly known internal combustion engine such as a diesel engine and the like according to the present invention.

While there has been described about the case that the EGR apparatus 30 is applied to a port injection type of engine which is adapted to inject the fuel to intake ports, the present invention is not limited to this case, but the EGR apparatus 30 may otherwise be applied to a cylinder injection type of engine which is adapted to inject the fuel directly to each of the combustion chambers 7. The EGR apparatus 30 may be applied to the engine which can perform both of the cylinder injection and the port injection.

The EGR apparatus 30 may be applied not only to the vehicle powered only by the engine 1 previously mentioned but also to a hybrid vehicle powered by an engine and a rotating electric motor.

EXPLANATION OF REFERENCE NUMERALS

1: engine
11: intake passage
11a: intake manifold
12: exhaust passage
12a: exhaust manifold
18: throttle valve
21: cooling water temperature sensor
22: air flow meter
24: pressure sensor
27: throttle opening degree sensor
29: accelerator opening degree sensor
30: EGR apparatus
32: EGR valve
33: EGR pipe
34: EGR passage
35: EGR shutoff valve
36: lift sensor 37: engine rotational speed sensor
38: vehicle speed sensor
39: shutoff valve opening degree sensor
57: ignition switch
100: ECU

The invention claimed is:

1. A control apparatus of an internal combustion engine for recirculating part of exhaust gas discharged into an exhaust passage from the internal combustion engine into an intake passage as an EGR gas, comprising:
   an EGR pipe having an EGR passage formed therein, the EGR passage having the exhaust passage held in communication with the intake passage;
   a first valve provided in the EGR passage in the vicinity of the exhaust passage and operative to take a desired state between an opened state and a closed state, the first valve being operative to shut off the EGR gas from being flowed into the EGR passage when the first valve is in the closed state;
   a second valve provided in the EGR passage between the intake passage and the first valve to take a desired state between an opened state and a closed state to adjust an amount of the EGR gas flowing into the intake passage;
   a foreign matter detection unit that detects a foreign matter adhered to the second valve;
   a switching unit that switches the first valve from the opened state to the closed state on the condition that the foreign matter detection unit detects the foreign matter adhered to the second valve; and
   a driving unit that drives the second valve between the opened state and the closed state, the driving unit being operative to drive the second valve between the opened state and the closed state on the condition that the foreign matter detection unit detects the foreign matter adhered to the second valve to have the switching unit switch the first valve from the opened state to the closed state.

2. The control apparatus of the internal combustion engine as set forth in claim 1, in which the foreign matter detection unit is operative to detect the foreign matter adhered to the second valve on the condition that a variation of a pressure of the intake passage in the opened state and in the closed state of the second valve is equal to or smaller than a predetermined value.

3. The control apparatus of the internal combustion engine as set forth in claim 2, in which the foreign matter detection unit is operative to detect the foreign matter adhered to the second valve during a fuel cut operation of the internal combustion engine.

4. The control apparatus of the internal combustion engine as set forth in claim 1, in which the foreign matter detection unit is operative to detect the foreign matter adhered to the second valve on the condition that the pressure of the intake passage in the downstream side of the second valve is higher than a predetermined value.

5. The control apparatus of the internal combustion engine as set forth in claim 1, in which the foreign matter detection unit is operative to detect the foreign matter adhered to the second valve on the condition that there is generated an accidental fire in the internal combustion engine.

6. The control apparatus of the internal combustion engine as set forth in claim 1, which
   further comprises an opening degree detection unit that detects an opening degree of the second valve,
   the foreign matter detection unit being operative to detect the foreign matter adhered to the second valve on the condition that a difference between a designated opening degree of the second valve and the opening degree detected by the opening degree detection unit is greater than a predetermined threshold value.

7. The control apparatus of the internal combustion engine as set forth in claim 1, which
   further comprises a cooling water temperature detection unit that detects a cooling water temperature of the internal combustion engine, the switching unit being operative to switch the first valve to the closed state on the condition that the cooling water temperature detected by the cooling water temperature detection unit is lower than a predetermined threshold value.

8. The control apparatus of the internal combustion engine as set forth in claim 7, in which the switching unit is operative to switch the first valve from the closed state to the opened state on the condition that the cooling water temperature detected by the cooling water temperature detection unit is equal to or higher than the predetermined threshold value.

9. The control apparatus of the internal combustion engine as set forth in claim 1, in which the driving unit is operative to drive the second valve between the opened state and the closed state in response to a combustion state of the internal combustion engine to adjust an amount of the EGR gas flowing into the intake passage.

10. The control apparatus of the internal combustion engine as set forth in claim 1, in which the driving unit is operative to drive the second valve to repeatedly take the opened state and the closed state on the condition that the foreign matter detection unit detects the foreign matter adhered to the second valve.

11. A control apparatus of an internal combustion engine for recirculating part of exhaust gas discharged into an exhaust passage from the internal combustion engine into an intake passage as an EGR gas, comprising:
   an EGR pipe having an EGR passage formed therein, the EGR passage having the exhaust passage held in communication with the intake passage;
   a first valve provided in the EGR passage in the vicinity of the exhaust passage and operative to take a desired state between an opened state and a closed state, the first valve being operative to shut off the EGR gas from being flowed into the EGR passage when the first valve is in the closed state;
   a second valve provided in the EGR passage between the intake passage and the first valve to take a desired state between an opened state and a closed state to adjust an amount of the EGR gas flowing into the intake passage; and
   an electronic control unit programmed:
      to detect a foreign matter adhered to the second valve;
      to switch the first valve from the opened state to the closed state on the condition that the electronic control unit detects the foreign matter adhered to the second valve; and
      to drive the second valve between the opened state and the closed state on the condition that the electronic control unit detects the foreign matter adhered to the second valve and switches the first valve from the opened state to the closed state.

12. The control apparatus of the internal combustion engine as set forth in claim 11, in which the electronic control unit is operative to detect the foreign matter adhered to the second valve on the condition that a variation of a pressure of the intake passage in the opened state and in the closed state of the second valve is equal to or smaller than a predetermined value.

13. The control apparatus of the internal combustion engine as set forth in claim 12, in which the electronic control unit is operative to detect the foreign matter adhered to the second valve during a fuel cut operation of the internal combustion engine.

14. The control apparatus of the internal combustion engine as set forth in claim 11, in which the electronic control unit is operative to detect the foreign matter adhered to the second valve on the condition that the pressure of the intake passage in the downstream side of the second valve is higher than a predetermined value.

15. The control apparatus of the internal combustion engine as set forth in claim 11, in which the electronic control unit is operative to detect the foreign matter adhered to the second valve on the condition that there is generated an accidental fire in the internal combustion engine.

16. The control apparatus of the internal combustion engine as set forth in claim 11, in which
the electronic control unit is further programmed to detect an opening degree of the second valve,
the electronic control unit being operative to detect the foreign matter adhered to the second valve on the condition that a difference between a designated opening degree of the second valve and the opening degree detected by the electronic control unit is greater than a predetermined threshold value.

17. The control apparatus of the internal combustion engine as set forth in claim 11, in which
the electronic control unit further programmed to detect a cooling water temperature of the internal combustion engine, the electronic control unit being operative to switch the first valve to the closed state on the condition that the cooling water temperature detected by the electronic control unit is lower than a predetermined threshold value.

18. The control apparatus of the internal combustion engine as set forth in claim 17, in which the electronic control unit is operative to switch the first valve from the closed state to the opened state on the condition that the cooling water temperature detected by the electronic control unit is equal to or higher than the predetermined threshold value.

19. The control apparatus of the internal combustion engine as set forth in claim 11, in which the electronic control unit is operative to drive the second valve between the opened state and the closed state in response to a combustion state of the internal combustion engine to adjust an amount of the EGR gas flowing into the intake passage.

* * * * *